May 21, 1935. H. A. JOHNSON 2,001,878
MOTOR VEHICLE
Filed April 30, 1934    3 Sheets-Sheet 1
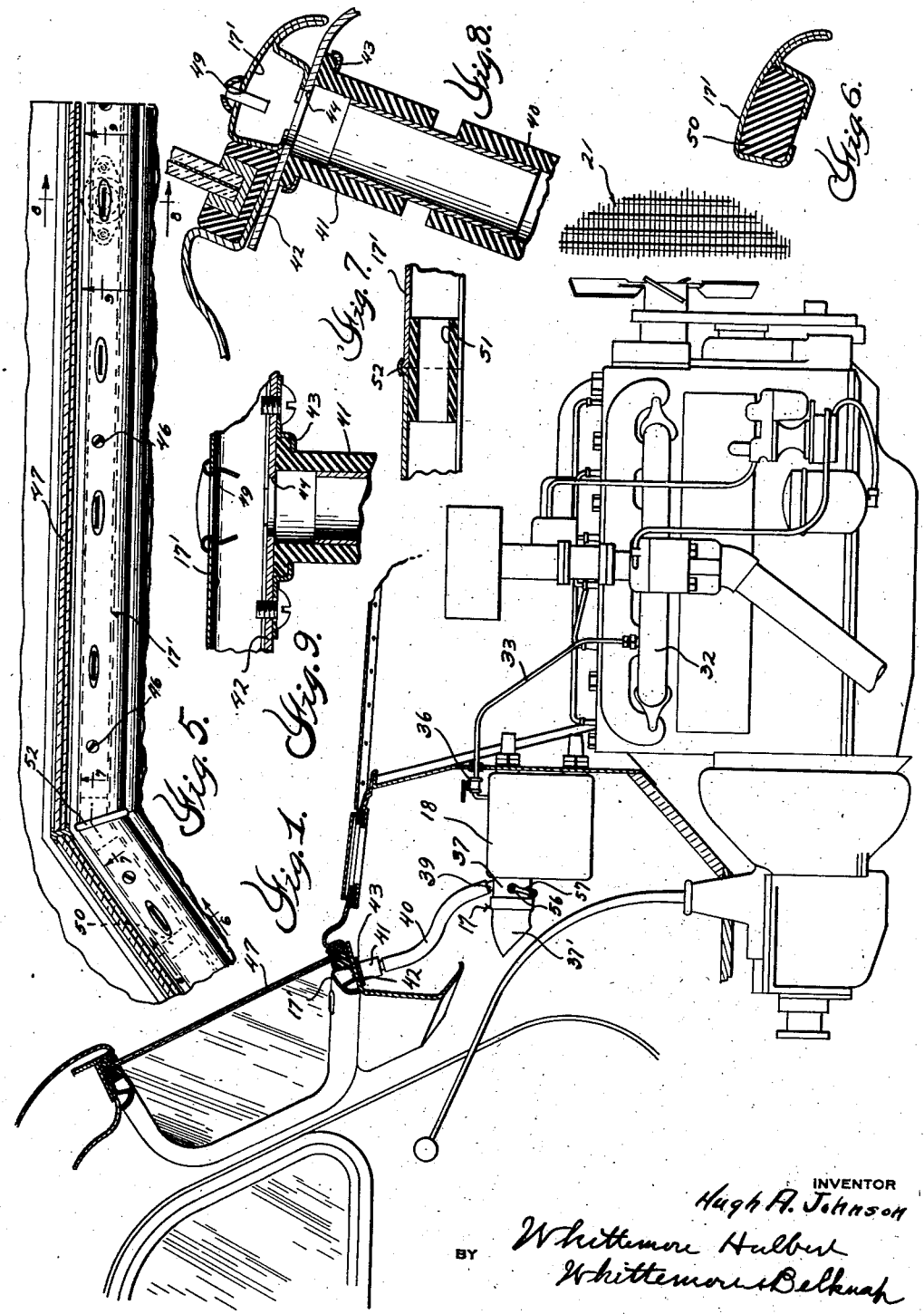

May 21, 1935.  H. A. JOHNSON  2,001,878
MOTOR VEHICLE
Filed April 30, 1934  3 Sheets-Sheet 2
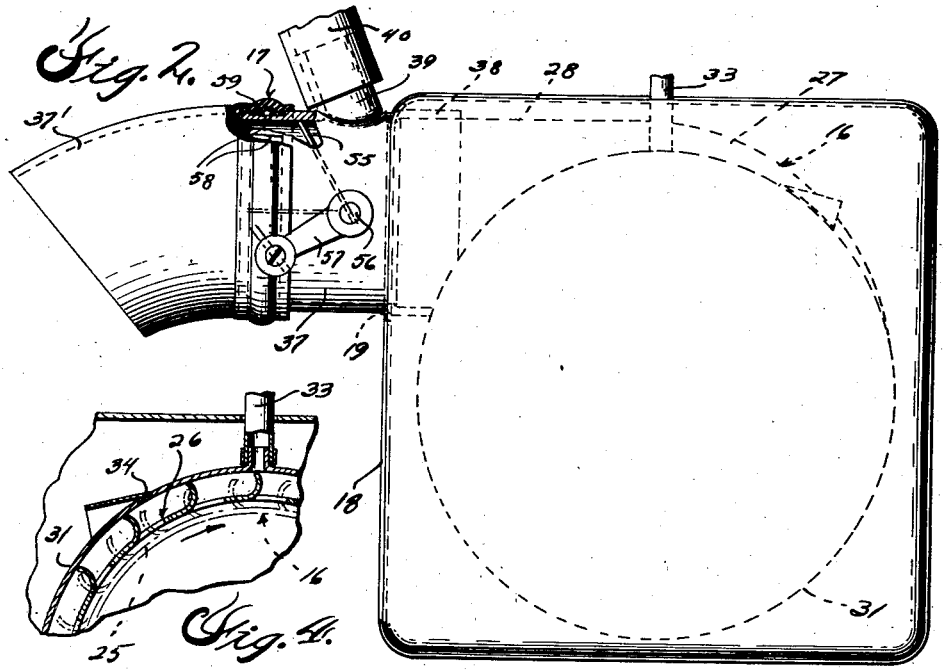
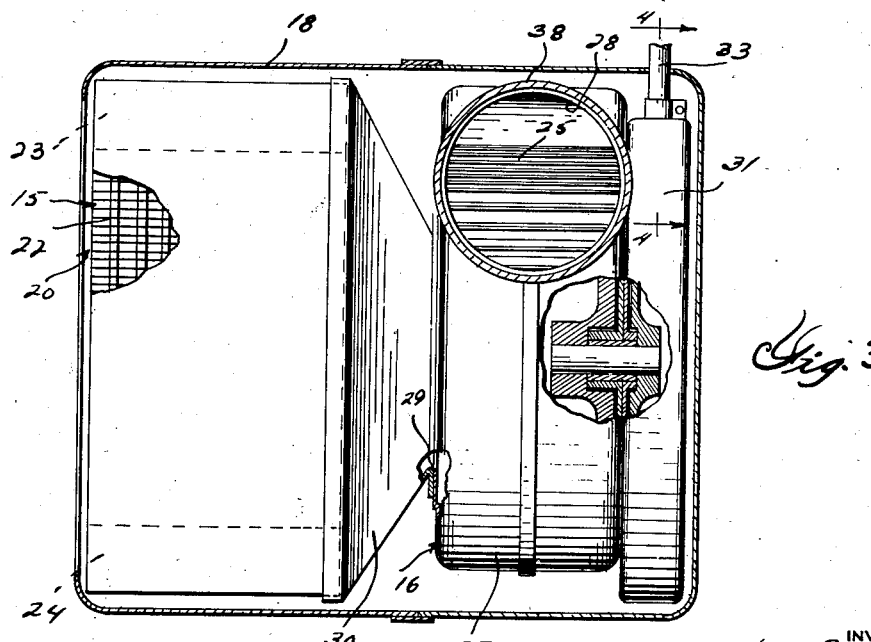
INVENTOR
Hugh A. Johnson
BY Whittemore Hulbert
Whittemore & Belknap
ATTORNEYS

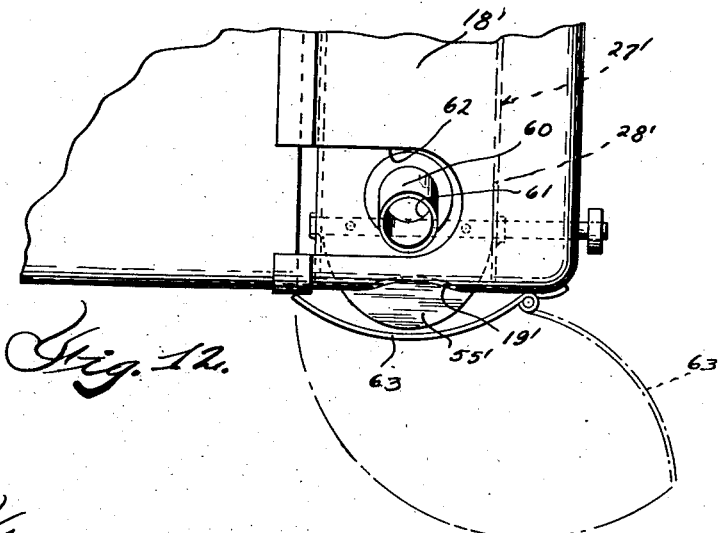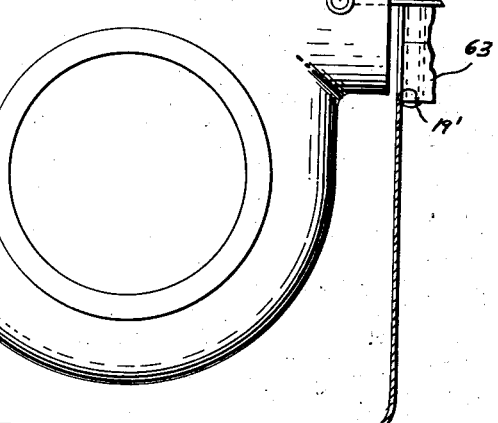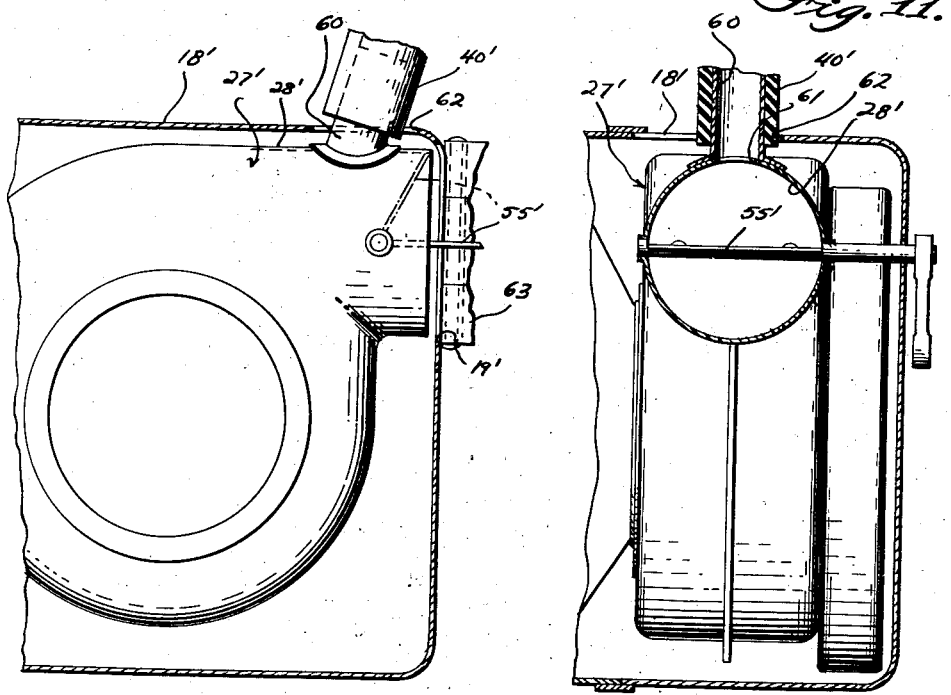

Patented May 21, 1935

2,001,878

UNITED STATES PATENT OFFICE 2,001,878

MOTOR VEHICLE

Hugh A. Johnson, Detroit, Mich., assignor to Hupp Motor Car Corporation, Detroit, Mich., a corporation of Virginia Application April 30, 1934, Serial No. 723,246

4 Claims. (Cl. 20—40.5)

This invention relates generally to motor vehicles and refers more particularly to an improved means for directing air against the inner side of the windshield of a vehicle body.

One of the principal features of the present invention is to provide relatively simple and inexpensive means for directing air against the inner side of a vehicle body windshield to prevent the accumulation of moisture or fog thereon and for preheating the air prior to discharging the same against the windshield in order to prevent the accumulation of ice or snow upon the outer side of the windshield.

Another advantageous feature of this invention resides in the provision of a heater for the interior of the vehicle body having means in association therewith for collecting heated air and directing the flow of the same toward the windshield.

Another object of this invention resides in the provision of means for directing heated air against the inner side of the windshield capable of being used in conjunction with a heater of the blower type in such a manner as to collect the required amount of heated air from the high pressure side of the blower prior to discharging the air from the heater.

A further advantageous feature of this invention resides in the provision of an air distributing manifold located at the inner side of the windshield adjacent thereto and designed to perform the additional function of a molding for securing the windshield in fixed relationship to the body.

With the foregoing, as well as other objects in view, the invention resides in the peculiar combination of a heater and air distributing means which will be made more apparent as this description proceeds, especially when considered in connection with the accompanying drawings, wherein:

Figure 1 is a diagrammatic view illustrating my invention in conjunction with one type of car heater;

Figure 2 is a side elevational view, partly in section, of a heater having my improved air distributing means in association therewith;

Figure 3 is a front elevational view, partly in section, of the construction shown in Figure 2;

Figure 4 is a fragmentary cross-sectional view taken on the line 4—4 of Figure 3;

Figure 5 is a plan view of the distributing manifold or molding for securing the windshield in place;

Figure 6 is a cross-sectional view taken on the line 6—6 of Figure 5;

Figure 7 is a similar view taken on the line 7—7 of Figure 5;

Figure 8 is a cross-sectional view taken on the line 8—8 of Figure 5;

Figure 9 is a cross-sectional view taken on the line 9—9 of Figure 5;

Figure 10 is a view similar to a portion of Figure 2, showing a slightly modified form of construction;

Figure 11 is a fragmentary front elevational view, partly in section, of the construction shown in Figure 10;

Figure 12 is a fragmentary plan view of the construction shown in Figure 11.

Although it will be apparent as this description proceeds that my improved air distributing system may be employed in association with various different types of heaters, nevertheless, for the purpose of illustration, I have shown this system in conjunction with a hot water heater of the blower type. In general, the particular type of heater selected herein for the purpose of illustrating my invention comprises a heat exchange unit or radiator core 15 arranged in series with the water circulatory system of the engine and having a fan or blower unit 16 adjacent thereto for drawing air through the same prior to discharging this air into the vehicle body. In accordance with this invention means, designated generally herein by the reference character 17, is provided for collecting a certain quantity of air from the high pressure side of the blower or fan 16 prior to discharging the air into the body of the vehicle and for conducting the air thus collected to the distributing manifold 17' secured adjacent the bottom of the windshield at the inner side thereof. As will be more fully hereinafter set forth, the manifold 17' is slotted at suitable points to provide for discharging the heated air against the inner side of the windshield and this manifold may be in the form of a molding for securing the windshield in fixed relationship to the body.

Although the heater assembly cooperates with my improved distributing means to perform the results previously set forth, nevertheless, the general construction of the heater assembly is well known to the trade, and, accordingly, it is not believed necessary to describe the same in detail herein. Briefly, the heater assembly shown herein for the purpose of illustrating this invention, comprises a casing 18 adapted to be supported in any suitable manner within the interior of a vehicle body, fragmentarily shown in Figure 1. The heat exchange unit or radiator 15 and the blower unit 16 are housed within the casing 18 so as to be concealed from view, and the casing is provided with an outlet opening 19 through the front wall thereof communicating with the discharge side of the blower unit.

The heat exchange unit 15 may be of any one of a number of designs providing for the passage of water therethrough and is herein shown as comprising a core 20 of the fin and tube type, similar in construction to the conventional automobile radiator designated in Figure 1 by the reference character 21. The upper ends of the tubes 22 of the core communicate with a suitable header 23, while the lower ends of the same tubes communicate with a bottom header 24 and both of these headers are connected to the water circulatory system of the engine in such a manner that the water flowing through the internal combustion engine will be by-passed into the core 20 prior to being returned to the main radiator 21 of the vehicle. The particular point of connection of the core 20 with the water circulatory system is so selected as to insure by-passing the water of greatest temperature available through the core, and since this is the usual procedure in installing heater assemblies, no effort has been made to show this connection in detail herein.

The blower unit 16 is for the purpose of drawing air through the core 20 prior to discharging this air into the interior of the vehicle body. In the present instance, the blower unit comprises a "Sirocco" fan 25 and an air driven impeller or turbine 26 for driving the fan. The fan 25 is journaled within a housing 27 so designed as to cooperate with the fan to build up a pressure therein upon rotation of the fan by the turbine 26. The housing 27 is provided with a tubular extension 28 forming an outlet opening for the air within the housing and communicating with the outlet opening 19 in the casing 18. In accordance with the usual practice, air is drawn into the housing 27 by the fan through the medium of an opening 29 in the side wall of the housing opposite the core 20 and in order to insure that the air discharged into the fan housing 27 is first drawn through the core 20, a conduit 30 is disposed within the housing 18 between the opening 29 and adjacent side of the core. With the above construction, it will be seen that the "Sirocco" fan within the housing 27 not only draws air through the core 20 of the heat exchange unit 15 into the housing 27 within the confines of the blades of the fan, but also forces this air through the outlet opening 19 in the casing 18 into the interior of the vehicle body. Inasmuch as water of relatively high temperature from the circulatory system of the engine is continuously by-passed through the core, it necessarily follows that the air drawn through the core and discharged into the body by the "Sirocco" fan is heated.

As previously stated, the "Sirocco" fan is driven by an air turbine 26 and this turbine is located within a housing 31 communicating with the vacuum system of the engine such as the intake manifold 32 by means of a conduit 33. In addition, the housing 31 is provided with an inlet opening 34 in the form of a nozzle extending in the direction of rotation of the turbine tangentially to the circumference of the latter. Briefly, the construction is such that upon operation of the power plant or internal combustion engine of the vehicle air is exhausted from the housing 31 by the vacuum system, with the result that as soon as the pressure in the housing drops below atmospheric, air will pass into the housing through the nozzle 34 at a relatively high velocity. The air flowing through the nozzle 34 into the housing 31 is directed against the blades of the turbine to drive the same, and due to the shaft connection between the turbine and fan, the latter is also driven. With this arrangement, it will be seen that the turbine automatically operates to rotate the fan as soon as the internal combustion engine is started, and in order to provide for discontinuing the operation of the heater assembly, a suitable valve 36 is disposed within the suction line 33 for closing communication between the manifold of the engine and the turbine housing 31.

As stated above, the present invention consists in using the heater assembly previously described for directing preheated air against the inner side of the windshield on the vehicle body. In the modification shown in Figures 1 to 9 inclusive, a portion of the heated air is directed from the discharge end 28 of the housing 27 into the air distributing manifold shown in Figure 5 by the reference character 17'. The foregoing is accomplished herein by providing a fitting 37 having a tubular rear end portion 38 extending through the opening 19 and sleeved over the tubular extension 28 of the housing 27. Formed upon the fitting beyond the opening 19 through the heater casing 18, is a tubular extension 39 inclined in the direction of air flow through the fitting and connected to the air distributing manifold 17' by means of a conduit 40. The lower end of the conduit 40 is sleeved upon the extension 39 while the upper end of the conduit is sleeved within a rubber bushing 41 secured to the cowling 42 of the body at the inner side of the windshield by means of a retainer plate 43. The cowling 42 is formed with an opening 44 therethrough in registration with the rubber sleeve 41 and this opening is concealed by means of a molding 17' having the dual function of distributing air upon the inner side of the windshield. The molding 17' may be of any suitable cross-sectional contour and is secured to the cowling 42 by means of screws 46 in such a manner as to perform the additional function of securing the windshield 47 in fixed relationship to the body. The upper end of the conduit 40 may be secured in communication with the interior of the air distributing manifold or molding 17' in numerous different ways, but I prefer the construction specifically described above, since the rubber sleeve 41 will insulate the conduit from metallic contact with the molding or cowling and thereby dampen any noise that may be transferred from the heater assembly through the conduit 40.

The molding extends entirely around the windshield at the inner side thereof and in the present instance, it is preferred to employ only the lower section 17' of the molding to distribute the air upon the inner side of the windshield and in order to provide an outlet for the air discharged into the lower section by the conduit 40, the upper wall of this section is slotted as at 49 at longitudinally spaced points. In order to prevent the air discharged into the lower section of the molding from escaping into the adjoining sections of this molding suitable rubber stoppers 50 are inserted in opposite ends of the lower section as shown in Figure 6.

Due to the peculiar shape of the windshield featured herein, it may be desirable to form the lower section of the molding from a plurality of strips and in cases of this character, precaution should be taken to effectively seal the joints between the adjacent ends of the strips. As shown in Figure 7, the foregoing is accomplished herein by providing a rubber insert 51 of sufficient length to extend within the adjacent ends of both strips and by concealing the resulting joint with a suitable clip 52.

Although it has been found that a very small quantity of air is sufficient to keep the windshield in proper condition for maximum visibility, nevertheless, it may be desired to actually direct a certain quantity of air flowing through the fitting 37 into the conduit 40 and in order to provide for this contingency, I have shown means in Figure 2 for accomplishing this result. The specific means illustrated herein comprises a semi-circular valve member 55 located within the fitting 37 and having the lower end secured to a shaft 56 journaled in the side walls of the fitting. The extremity of the shaft 56 extends laterally through one side wall of the fitting and is provided with a suitable operating lever 57. The particular location of the valve member 55 within the fitting is clearly shown in Figure 2, and is such that when the valve is in the full line position illustrated in this figure, it acts as a baffle to direct the air flowing through the upper portion of the fitting into the conduit 40. On the other hand, when the valve member is in the dotted line position shown in Figure 2, the majority of the air discharged by the fan is permitted to pass through the fitting into the vehicle body. Of course, even in the latter or open position of the valve member, some air may be conducted into the distributing manifold 17' through the conduit 40, but this is not objectionable since it will tend to prevent any tendency for moisture to accumulate on the windshield.

The fitting 37 aside from forming a housing for the valve member may also be utilized to support a suitable deflector in association with the heater assembly. The deflector is shown in Figure 2 by the reference character 37' and is preferably sleeved upon the forward end of the fitting in such a manner as to permit the same to be adjusted relative thereto. Although the aforesaid connection is such as to provide for adjustment of the deflector relative to the fitting, nevertheless, the same will also operate to hold the deflector in any one of its several adjusted positions and this is accomplished herein by interposing a flexible split ring 58 between the fitting and deflector. The flexible ring 58 is held against axial displacement relative to the fitting by forming an annular recess 59 in the fitting of sufficient width to receive the ring 58. The deflector is also preferably formed of rubber in order to dampen the noise of operation of the heater assembly.

The modified form of construction shown in Figures 10 to 12 inclusive differs from the embodiment of the invention previously described in that the fitting 37 is eliminated and the conduit 40' communicated directly with the tubular extension 28' of the housing 27' by means of a tubular fitting 60 registering with an opening 61 through the upper side of the extension 28'. The fitting 60 extends upwardly through an opening 62 in the heater assembly casing 18' and is inclined in the direction of air flow so as to receive a more liberal quantity of air as the latter is discharged into the tubular extension 28'. The conduit 40' is sleeved upon the fitting 60 and the upper end of this conduit may be connected to the molding or heat distributing manifold 17' in the same manner as described in connection with the above embodiment of the invention.

Inasmuch as the fitting 37 is eliminated in the modification shown in Figures 10 to 12 inclusive, the valve 55' is supported within the extension 28' of the housing 27' in the same manner as the valve 55 is supported in the fitting 37, with the result that the valve 55' will also operate to direct a liberal quantity of air through the conduit 40' to the distributing manifold or windshield molding 17'. It may be pointed out at this time that both the valves 55 and 55' are inclined in the direction of fuel flow when in their closed positions so as to facilitate the passage of the fuel into the conduits leading to the distributing manifold.

The modification shown in Figures 10 to 12 inclusive also differs from the first described form of the invention in the particular type of deflector employed for directing the air flowing from the heater assembly. This deflector is shown in Figure 12 by the reference character 63 and merely comprises a metal cap hingedly connected to the casing 18' at one side of the opening 19' therethrough. The construction is such as to provide for movement of the deflector from the full line position shown in Figure 12 wherein the air discharged by the heating unit is directed laterally in opposite directions, to the dotted line position illustrated in the same figure wherein passage of air out of the discharge opening 19' is unobstructed thereby.

Thus from the foregoing, it will be seen that I have provided relatively simple and inexpensive means for directing heated air against the inner side of a windshield. It will also be apparent that one of the features which provides for economical installation resides in employing a portion of the conventional windshield molding as a manifold for distributing the air against the windshield, and another feature which contributes materially to economical manufacture as well as efficient operation consists in utilizing the vehicle body heater assembly to furnish the quantity of heated air required for the above purpose.

What I claim as my invention is:

1. In a motor vehicle having a body provided with a windshield, the combination with a heater assembly having an air discharge passage and having means for discharging preheated air through the passage, of a molding fashioned to receive air and removably secured to the body at the inner side of the windshield in engagement with the latter to hold the same against inward movement and having an opening in the top wall thereof, and means establishing communication between the molding and discharge passage of the heater permitting warm air to be conducted to the molding.

2. In a motor vehicle having a body provided with a windshield, the combination with a heater assembly having an air discharge passage and having means for discharging preheated air through the passage, of a molding fashioned to receive air and removably secured to the body at the inner side of the windshield in engagement with the latter to hold the same against inward movement and having an opening in the top wall thereof, means establishing communication between the molding and discharge passage of the heater for by-passing warm air from the heater to the molding, and means for controlling the amount of air by-passed to the molding.

3. In a motor vehicle having a body provided with a windshield, the combination with a heater assembly having an air discharge passage and having means for discharging preheated air through the passage, of a molding fashioned to receive air and removably secured to the body at the inner side of the windshield in engagement with the latter to hold the same against inward movement and having an opening in the top wall thereof, means establishing communication between the molding and discharge passage of the heater, and a baffle located within said discharge passage for directing warm air from the heater into the communication between the passage and manifold.

4. In a motor vehicle having a body provided with a windshield opening surrounded by a shoulder and a windshield for the opening abutting the inner side of the shoulder, the combination with a heater assembly having an air discharge passage and having means for discharging preheated air through the passage, of a molding fashioned to receive air and removably secured to the body at the inner side of the windshield in engagement with the latter to clamp the same against the shoulder and having an opening in the top wall thereof, and means establishing communication between the molding and discharge passage of the heater permitting warm air to be conducted to the molding.

HUGH A. JOHNSON.